(12) United States Patent
Braun et al.

(10) Patent No.: US 7,548,165 B2
(45) Date of Patent: Jun. 16, 2009

(54) PERFORMANCE ENHANCEMENT ALGORITHM FOR RADIO FREQUENCY IDENTIFICATION (RFID) SYSTEMS

(75) Inventors: John F. Braun, Fairfield, CT (US);
Jean-Hiram Coffy, Norwalk, CT (US);
Arthur J. Parkos, Southbury, CT (US);
Michael P. Swenson, Danbury, CT (US)

(73) Assignee: Pintey Bowes Inc., Stamford, CT (US)

( * ) Notice: Subject to any disclaimer, the term of this patent is extended or adjusted under 35 U.S.C. 154(b) by 457 days.

(21) Appl. No.: 11/397,160

(22) Filed: Apr. 4, 2006

(65) Prior Publication Data
US 2007/0236337 A1 Oct. 11, 2007

(51) Int. Cl.
*G08B 13/14* (2006.01)

(52) U.S. Cl. ............... 340/572.7; 340/539.1; 340/572.1; 340/572.2; 340/572.4

(58) Field of Classification Search ............... 340/539.1, 340/539.13, 539.21, 572.1, 572.2, 572.4, 340/10.1, 505
See application file for complete search history.

(56) References Cited

U.S. PATENT DOCUMENTS

| | | | | |
|---|---|---|---|---|
| 7,053,777 B2 * | 5/2006 | Allen | ....................... | 340/572.1 |
| 7,119,692 B2 * | 10/2006 | Lieffort et al. | ........... | 340/572.4 |
| 7,372,364 B2 * | 5/2008 | Mercer et al. | ............ | 340/572.1 |
| 2001/0040513 A1 * | 11/2001 | McDonald | ............. | 340/825.49 |
| 2007/0075836 A1 * | 4/2007 | Lieffort et al. | ............. | 340/10.1 |
| 2007/0200712 A1 * | 8/2007 | Ameson et al. | .......... | 340/572.8 |

* cited by examiner

*Primary Examiner*—Daryl C Pope
(74) *Attorney, Agent, or Firm*—Brian A. Collins; Angelo N. Chaclas (57) ABSTRACT

A method for enhancing the accuracy a Radio Frequency IDentification (RFID) system which may exhibit inconsistent RFID tag reporting behavior. The method includes the steps of (i) establishing a timeout setting indicative of the time that each interrogating antenna transmits RF energy within a respective read field, (ii) evaluating/comparing reporting results over multiple interrogation cycles to determine when an RFID tag exhibits inconsistent reporting behavior within the read field and (iii) increasing the timeout setting of the respective interrogating antenna to enhance the energy harvested by an RFID tag/device during each interrogation cycle. In lieu of, or in addition to, increasing the timeout setting, the method evaluates the responses received over multiple cycles and accepts such responses as being valid only when the same response is obtain over consecutive/sequential interrogation cycles. That is, the system evaluates the results of several cycles before accepting the validity or veracity of the response.

19 Claims, 7 Drawing Sheets

| I | II | III | IV | V | VI | VII | VIII | IX | X | XI | XII |
|---|---|---|---|---|---|---|---|---|---|---|---|
| ANT No. | RFID CLASS | REPORT. PERIOD | RFID TAG #S | TIMEOUT SETTING (T=0) | THRESHOLD TIME PERIOD | # OF RFID TAGS | ELAPSED TIME - LAST TAG | PERIOD DIFFERENTIAL | VARIANCE | % Δ (1) | ADAPTIVE TUNING VALUES (2) |
| | | | | | | | III x VII | V - VIII | IX - VI | | INV (X x XI) |
| 1 | 1 | 12 ms | 1 - 12 | 120 ms | 24 ms | 10 | 120 ms | 0 ms | (24 ms) | 200 | 48 ms |
| 2 | 1 | 12 ms | 13 & 14 | 120 ms | 24 ms | 2 | 24 ms | 96 ms | 72 ms | 50 | (36 ms) |
| 3 | 1 | 12 ms | - | 120 ms | 24 ms | 0 | 0 ms | 120 ms | 96 ms | 50 | (48 ms) |
| 4 | 0 | 12 ms | - | 120 ms | 24 ms | 0 | 0 ms | 120 ms | 96 ms | 50 | (48 ms) |
| 5 | 0 | 12 ms | 15, 16 & 17 | 120 ms | 24 ms | 3 | 36 ms | 84 ms | 60 ms | 50 | (30 ms) |
| 6 | 1 | 12 ms | 18 | 120 ms | 24 ms | 1 | 12 ms | 108 ms | 84 ms | 50 | (42 ms) |
| 7 | 1 | 12 ms | 19 & 20 | 120 ms | 24 ms | 2 | 24 ms | 96 ms | 72 ms | 50 | (36 ms) |
| 8 | 1 | 12 ms | - | 120 ms | 24 ms | 0 | 0 ms | 120 ms | 96 ms | 50 | (48 ms) |
| TOTAL INTERROGATION CYCLE TIME | | | | 960 ms | | | | | | | |

(1) IF VALUE IN X IS NEG THEN % CHANGE = 200,
IF VALUE IN X IS ZERO OR POS THEN % CHANGE = 50
(2) IF CALCULATED AT VALUE ≤ VALUE III THEN NO CHANGE (NC)

FIG. 3a

| I | II | III | IV | V | VI | VII | VIII | IX | X | XI | XII |
|---|---|---|---|---|---|---|---|---|---|---|---|
| ANT No. | RFID CLASS | REPORT. PERIOD | RFID TAG #S | TIMEOUT SETTING (T=0) | THRESHOLD TIME PERIOD | # OF RFID TAGS | ELAPSED TIME - LAST TAG | PERIOD DIFFERENTIAL | VARIANCE | % Δ (1) | ADAPTIVE TUNING VALUES (2) |
|  |  |  |  |  |  |  | III x VII | V - VIII | IX - VI |  | INV (X x XI) |
| 1 | 1 | 12 ms | 1-12 | 168 ms | 24 ms | 12 | 144 ms | 24 ms | 0 ms | 200 | NC |
| 2 | 1 | 12 ms | 13 & 14 | 84 ms | 24 ms | 2 | 24 ms | 60 ms | 36 ms | 50 | (18 ms) |
| 3 | 1 | 12 ms | – | 72 ms | 24 ms | 0 | 0 ms | 72 ms | 48 ms | 50 | (24 ms) |
| 4 | 0 | 12 ms | – | 72 ms | 24 ms | 0 | 0 ms | 72 ms | 48 ms | 50 | (24 ms) |
| 5 | 0 | 12 ms | 15, 16 & 17 | 90 ms | 24 ms | 3 | 36 ms | 54 ms | 30 ms | 50 | (15 ms) |
| 6 | 1 | 12 ms | 18 | 78 ms | 24 ms | 1 | 12 ms | 66 ms | 42 ms | 50 | (21 ms) |
| 7 | 1 | 12 ms | 19 & 20 | 84 ms | 24 ms | 2 | 24 ms | 60 ms | 36 ms | 50 | (18 ms) |
| 8 | 1 | 12 ms | – | 72 ms | 24 ms | 0 | 0 ms | 72 ms | 48 ms | 50 | (24 ms) |
| TOTAL INTERROGATION CYCLE TIME |  |  |  | 720 ms |  |  |  |  |  |  |  |

(1) IF VALUE IN X IS NEG THEN % CHANGE = 200, IF VALUE IN X IS ZERO OR POS THEN % CHANGE = 50
(2) IF CALCULATED AT VALUE ≤ VALUE IN III THEN NO CHANGE (NC)

FIG. 3b

| I | II | III | IV | V | VI | VII | VIII | IX | X | XI | XII |
|---|---|---|---|---|---|---|---|---|---|---|---|
| ANT No. | RFID CLASS | REPORT. PERIOD | RFID TAG #S | TIMEOUT SETTING (T=0) | THRESHOLD TIME PERIOD | # OF RFID TAGS | ELAPSED TIME - LAST TAG | PERIOD DIFFERENTIAL | VARIANCE | % Δ (1) | ADAPTIVE TUNING VALUES (2) |
| | | | | | | | III x VII | V - VIII | IX - VI | | INV (X x XI) |
| 1 | 1 | 12 ms | 1 - 12 | 168 ms | 24 ms | 12 | 144 ms | 24 ms | 0 ms | 200 | NC |
| 2 | 1 | 12 ms | 13 & 14 | 66 ms | 24 ms | 2 | 24 ms | 42 ms | 18 ms | 50 | NC |
| 3 | 1 | 12 ms | — | 48 ms | 24 ms | 0 | 0 ms | 48 ms | 24 ms | 50 | NC |
| 4 | 0 | 12 ms | — | 48 ms | 24 ms | 0 | 0 ms | 48 ms | 24 ms | 50 | NC |
| 5 | 0 | 12 ms | 15, 16 & 17 | 75 ms | 24 ms | 3 | 36 ms | 44 ms | 20 ms | 50 | NC |
| 6 | 1 | 12 ms | 18 | 57 ms | 24 ms | 1 | 12 ms | 45 ms | 21 ms | 50 | NC |
| 7 | 1 | 12 ms | 19 & 20 | 66 ms | 24 ms | 2 | 24 ms | 42 ms | 18 ms | 50 | NC |
| 8 | 1 | 12 ms | — | 48 ms | 24 ms | 0 | 0 ms | 48 ms | 24 ms | 50 | NC |
| TOTAL INTERROGATION CYCLE TIME | | | | 576 ms | | | | | | | |

(1) IF VALUE IN X IS NEG THEN % CHANGE = 200, IF VALUE IN X IS ZERO OR POS THEN % CHANGE = 50
(2) IF CALCULATED AT VALUE ≤ VALUE IN III THEN NO CHANGE (NC)

FIG. 4b

PERFORMANCE ENHANCEMENT ALGORITHM FOR RADIO FREQUENCY IDENTIFICATION (RFID) SYSTEMS

RELATED APPLICATION

This patent application relates to commonly-owned, co-pending application Ser. No. 11/397,244 entitled "ADAPTIVE RADIO FREQUENCY IDENTIFICATION CONTROL ALGORITHM"

FIELD OF THE INVENTION

The present invention relates to Radio Frequency IDentification (RFID) systems and, more particularly, to a new and useful control algorithm therefor which optimizes the accuracy, veracity and conclusions which may be drawn from the RFID system.

BACKGROUND OF THE INVENTION

Radio Frequency Identification (RFID) is a method of identifying unique devices, and information contained therein, using radio waves. Typically, a reader communicates with a tag/device which holds unique digital information in a microchip. The tag/device may employ select materials to reflect back a portion of the transmitted radio waves thereby providing an indication that the tag/device is within the field or zone of the interrogating reader.

RFID systems can be passive, active or semi-passive. A passive RFID system employs a passive tag/device having a receiving antenna which is sufficiently large, or selectively shaped/dimensioned, to capture (or harvest) energy from a surrounding electromagnetic field, i.e., the radio frequency energy, to power the passive tag/device. The receiving antenna is electrically connected to a central microchip which performs various preprogrammed RFID functions. An active RFID system employs an active tag/device having an energy source, e.g., an embedded battery, to power the active device and broadcast signals to the reader. Consequently, active RFID systems do not require an electromagnetic field to power the tag/device. A semi-passive system is similar to active systems in the sense that an energy source is employed to power a tag/device, however, the energy is used to activate or augment the microchip's processing capability rather than to broadcast signals back to the reader. The tags/device employed in semi-passive systems are also referred to as battery-assisted tags inasmuch as a portion of the energy is acquired from the tag while another portion is obtained from the read field of the antenna. As such, semi-passive tags increase the read range of the RFID system.

RFID systems operate in the Low, High and Ultra-High Frequency radio frequency bands or between the range of about 125 kHz (LF) to about 960 MHz (UHF). Generally, RFID devices operating in the LF bands are preferable for short ranges while those operating in the high or ultra-high frequency (HF or UHF) bands are preferable for longer ranges. RFID technology is continuously improving and, currently, readers can produce a field such that a device located therein can be energized and/or interrogated at distances of up to 1000 feet (especially when using powered/active tags).

Readers often employ multiplexers which utilize a plurality of antennas activated serially or in seriatim. More specifically, each of the antennas interrogates a field or zone for a certain period of time to ensure that all tags, i.e., anticipated to be located within the particular read field, have had sufficient time to harvest the RF energy and report its information back to the reader. For example, a reader having eight (8) antennas each interrogating a field for a period of about ten (10) seconds (i.e., to ensure that each tag/device within a specific read field has had ample opportunity to respond/report information) will require a total of eighty (80) seconds (or 1⅓ minutes) to complete one full interrogation cycle. Therefore, as the number of antennas increase to cover a larger territory, the time required to complete an interrogation cycle increases proportionally.

RFID systems facilitate tracking of various items (i.e., items which have an accompanying RFID tag/device) for the purpose of controlling merchandise, maintaining inventory levels, or simply monitoring the location and/or flow of important documents. Furthermore, inasmuch as RFID systems utilize time-stamping (typically measured from a common reference such as the EPOCH) to identify when a particular tag/device was identified by the reader, certain information can be ascertained and conclusions drawn from information reported.

For example, if eight (8) tagged items report their presence within one read field, and, following a subsequent interrogation cycle, six (6) tagged items report their original location/read field with the remaining two (2) tagged items reporting a location in an adjacent read field, then one may conclude that two (2) of the tagged items have moved from one location to another during the elapsed time period. If, on the other hand, four (4) tagged items moved from their original location/read field, but two (2) of the tagged items returned to their original location/read field within the time frame of an interrogation cycle, then the RFID system may incorrectly characterize the transfer or movement of all of the items. That is, two (2) of the tagged items may incorrectly be characterized as having been stationary, i.e., remaining in the original location, for the duration of the interrogation cycle—despite the fact that these two items moved and returned before the system could properly or correctly track such movement.

The example above, therefore, highlights the difficulties or inaccuracies caused by the time elapsed during an interrogation cycle. More specifically, it emphasizes the need for minimizing the time required for interrogation without compromising tag information or location data.

Another difficulty or phenomena that decreases accuracy/veracity relates to fringe conditions causing intermittent reads. That is, tags located at the edge, or on the "fringe" of an antenna(s) read field/range can be unreliable or exhibit intermittent behavior. The tag/device may, during one interrogation cycle, acquire sufficient energy to respond to the reader, but on a subsequent cycle not collect sufficient energy to be responsive. While many reasons may give rise to this behavior, generally ambient conditions or surrounding structure block or attenuate the energy radiated by the antenna such that the tag is unable to acquire sufficient energy. An intermittent signal of the type described, therefore, may not be sufficiently reliable to derive accurate results or conclusions.

A need, therefore, exists for an RFID system which reliably and accurately activates/reads RFID tags/devices.

SUMMARY OF THE INVENTION

A method is provided for enhancing the accuracy a Radio Frequency IDentification (RFID) system which may exhibit inconsistent RFID tag reporting behavior. The method includes the steps of (i) establishing a timeout setting indicative of the time that each interrogating antenna transmits RF energy within a respective read field, (ii) evaluating/comparing reporting results over multiple interrogation cycles to determine when an RFID tag exhibits inconsistent reporting behavior within the read field and (iii) increasing the timeout setting of the respective interrogating antenna to enhance the energy harvested by an RFID tag/device during each interrogation cycle. In lieu of, or in addition to, increasing the timeout setting, the method evaluates the responses received over multiple cycles and accepts such responses as being valid only when the same response is obtain over consecutive/sequential interrogation cycles. That is, the system evaluates the results of several cycles before accepting the validity or veracity of the response.

BRIEF DESCRIPTION OF THE DRAWINGS

Reference is now made to the various figures wherein like reference numerals designate similar items in the various figures and in which.

DETAILED DESCRIPTION OF THE INVENTION

The present invention is described in the context of a Radio Frequency Identification (RFID) system having a plurality of antennas communicating with a single RFID reader. Each antenna produces a respective read field within an area of interest, i.e., an office space or inventory stock room, and interrogate/communicate with various RFID tags/devices which may be disposed within the respective read field. The read fields produced may be circular or linear polarized (i.e., directional) antennas depending upon the configuration or region of interest, e.g., a square office area, rectangular isle, etc. Furthermore, the read fields will generally be configured to span or provide coverage for the entire area to ensure that all RFID tags/devices within the area receive or harvest sufficient energy to communicate with the antenna/reader. In another embodiment of the invention, described in greater detail hereinafter, the RFID system is dynamically tuned to improve the energy harvested by an RFID tag/device should a tag/device be located along a fringe area or condition of a respective read field.

Figure 1:
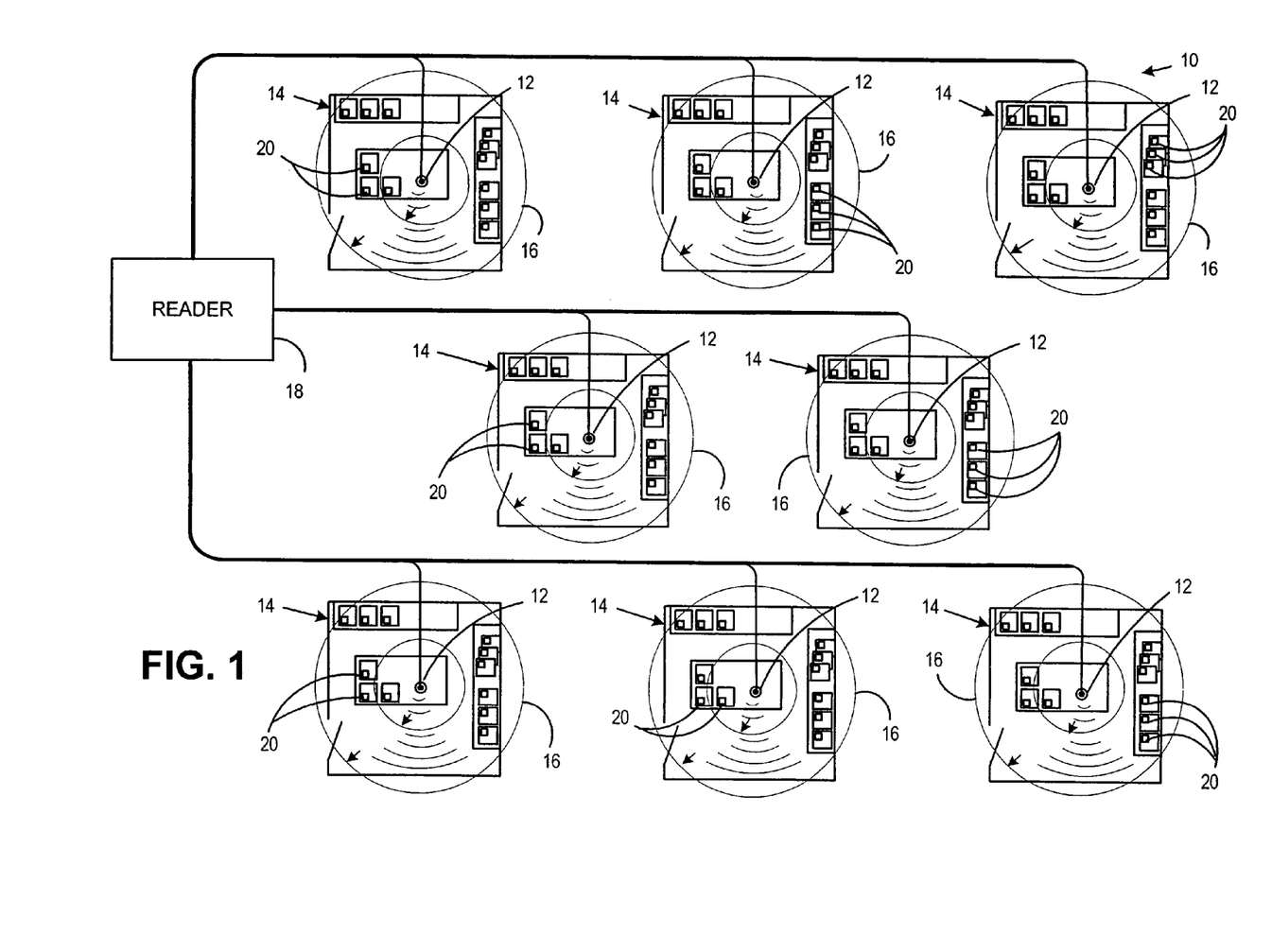
FIG. 1 is a schematic block diagram of a Radio Frequency IDentification (RFID) system having a plurality of antennas which collaboratively establish respective read fields for interrogating the presence and/or location of RFID tags/devices.

In the described embodiment, and referring to FIG. 1, the RFID system 10 employs eight (8) RF antennas 12 each disposed within an office area 14 and produces a substantially circular read field 16. The antennas 12 are electrically connected to a central reader 18 which is capable of supplying or transmitting RF energy to the antennas in addition to receiving and processing digital information therefrom. More specifically, the reader 18 is preprogrammed to sequentially power each antenna for a specific period of time, typically referred to as the "timeout setting". The timeout setting may also be viewed as the period of time that the interrogating antenna transmits RF energy within a respective read field 16 to power, energize or activate RFID tags/devices 20 which may be located or disposed within the read field 16.

The reader 18 will also include an anti-collision algorithm to prevent the various tag/devices from simultaneously transmitting feedback signals to or communicating with the reader at the same time. That is, the anti-collision algorithm causes the various tags/devices to stagger the tag feedback to prevent the signals from "colliding" or interfering with each other. Inasmuch as such anti-collision algorithms are well known in art of RFID systems, no further discussion of its operation is provided or warranted for implementing the teachings of the present invention.

Figure 2:
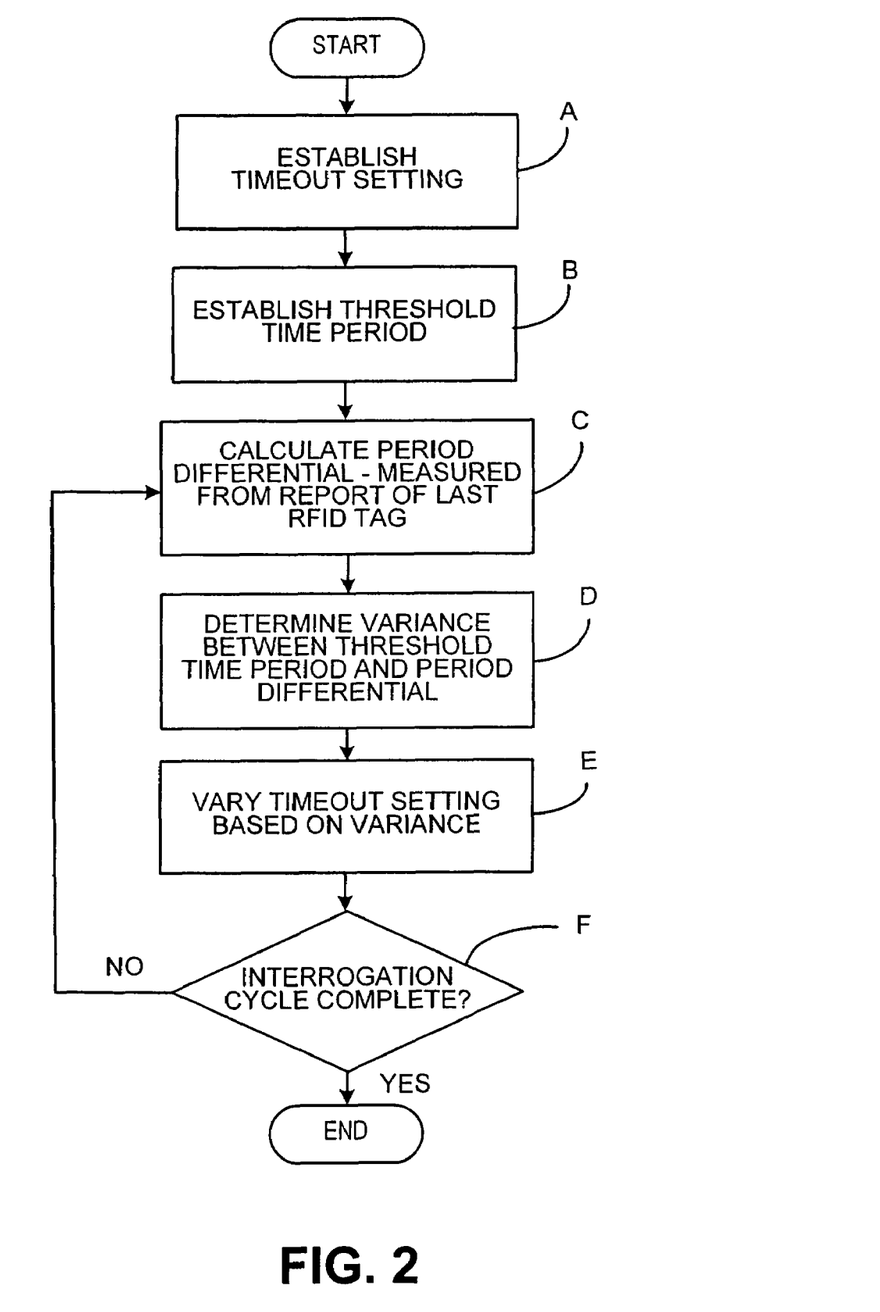
FIG. 2 is a flow diagram of a method for enhancing the performance of an RFID system by adaptively tuning the RFID system.

In FIG. 2, a method for adaptively tuning the RFID system is provided to optimize the interrogation cycle within each of the respective antenna read fields. In a first step A of the method, a baseline or initial timeout setting is established which is indicative of the time that each interrogating antenna powers a read field during a respective read period. Generally, the timeout setting will be determined based upon the number of RFID tags/devices which are anticipated to be located within a specific read field, and upon the type or "Class" of RFID tag employed in the system. With respect to the latter, RFID tags/devices are rated in various classes depending upon the type or complexity of the functions performed by the RFID tag.

For example, the most elementary or fundamental RFID tag (e.g., a Class 0 tag) may be one which is a passive device having the sole function of reporting a serial number to an interrogating antenna. As such, RFID tags of this type require a short time period or "reporting period" to perform such function, i.e., on the order of three milliseconds (3 ms). RFID tags which are more complex (e.g., Class 1 tags) may include active RFID devices which may report location and identification information to the interrogating antenna. Accordingly, RFID tags of this type may require a longer reporting period, i.e., on the order of twelve milliseconds (12 ms). Higher class tags may incorporate additional functionality such as cross-communication with other tags within the same or adjacent read fields. As such, even longer reporting periods or response times may be required when employing RFID tags having increased sophistication or complexity.

In step B, a threshold time period is established for the purpose of defining when, and by what amount or degree, the RFID system requires adaptive tuning. The threshold time period may be based upon the reporting period, or the time typically necessary, to acquire the RF energy and communicate RFID tag information to the respective interrogating antenna. While the threshold time period will, at minimum, be based upon the class of RFID tag employed in a particular system, the threshold time period will generally be the product of the reporting period and a factor/coefficient or percentage of the reporting period. For example, the threshold time period may be equal to a value X equal to one-hundred and fifty percent (150%) of the reporting period. Alternatively, the value X may be an even multiple of the reporting period, e.g., twice or 200% thereof. The rationale for establishing the magnitude of the threshold time period will come into greater focus when discussing the steps for adaptively tuning the timeout setting with each interrogation cycle of the RFID system.

In step C, a period differential is calculated between the timeout setting and an elapsed time for a final RFID tag within the respective read field to communicate its RFID tag information. More specifically, this method step C determines the time differential between the last RFID tag to report and the end of the timeout setting. For example, if the timeout setting of a particular antenna is set to one-hundred and twenty milliseconds (120 ms) and three (3) Class 1 RFID tags report information within an elapsed time of thirty-six milliseconds (36 ms) within a respective read field, then the period differential is the difference therebetween or eighty-four milliseconds (84 ms).

In step D, a variance is calculated as the difference between the period differential and the threshold time period. As suggested above, a threshold time period may be established in step B above as being a multiple of the reporting period. If the reporting period for a class 1 RFID tag is twelve milliseconds (12 ms), then the threshold time period may be established at, for example, twice the reporting period or twenty-four milliseconds (24 ms). Using the values discussed above, the variance is calculated to be sixty milliseconds (60 ms) or twenty four milliseconds (24 ms) subtracted from eighty-four milliseconds (84 ms).

In steps E and F, the timeout setting of each interrogating antenna may be adaptively varied in accordance with the respective variance. That is, with each interrogation cycle, the timeout setting for each antenna may be incremented or decremented to optimize the interrogation time of the overall RFID system. For example, should a timeout setting have been established at a substantially higher value than the elapsed time required for reporting, i.e., the reporting period, then greater efficiencies may be achieved by reducing the timeout setting during the next or subsequent interrogation cycles. On the other hand, should a greater number of RFID tags be present and reporting in a particular read field, i.e., such that all of the RFID tags may not have reported or communicated with the interrogating antenna, then it may be desirable to expand the timeout setting. As such, by incrementing the timeout setting with each subsequent interrogation cycle, i.e., such that the timeout setting is stabilized from one cycle to the next, then the system can confidently read all of the RFID tags.

It should also be appreciated that the timeout setting may be varied directly from information obtained from the period differential, however, for more refined tuning a comparison is made using the variance, i.e., the difference between the threshold value and the period differential. For example, it may be appropriate to decrement the timeout setting if the period differential is greater than some percentage of the timeout setting. That is, if the period differential is calculated to be fifty percent (50%) of the timeout setting, then one can conclude that the timeout setting is larger than necessary. Consequently, it may be appropriate to decrement the timeout setting by twenty-five percent (25%), or fifty percent (50%) of the period differential, during the next or subsequent interrogation cycle.

Figure 3A:
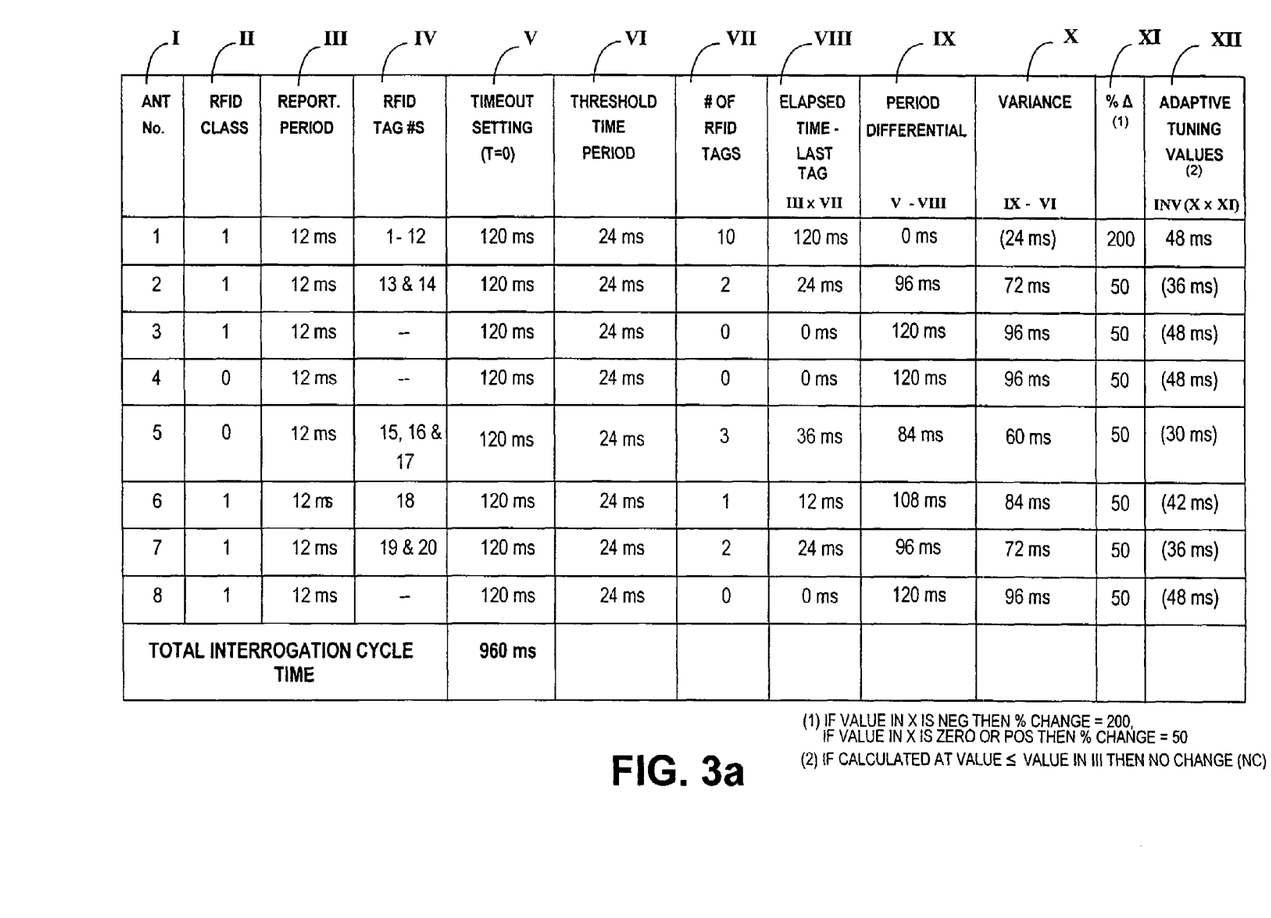
FIG. 3a shows RFID tag information in tabular format indicative of various settings and values of an RFID system according to the present invention while the system performs an initial interrogation cycle.
Figure 3B:
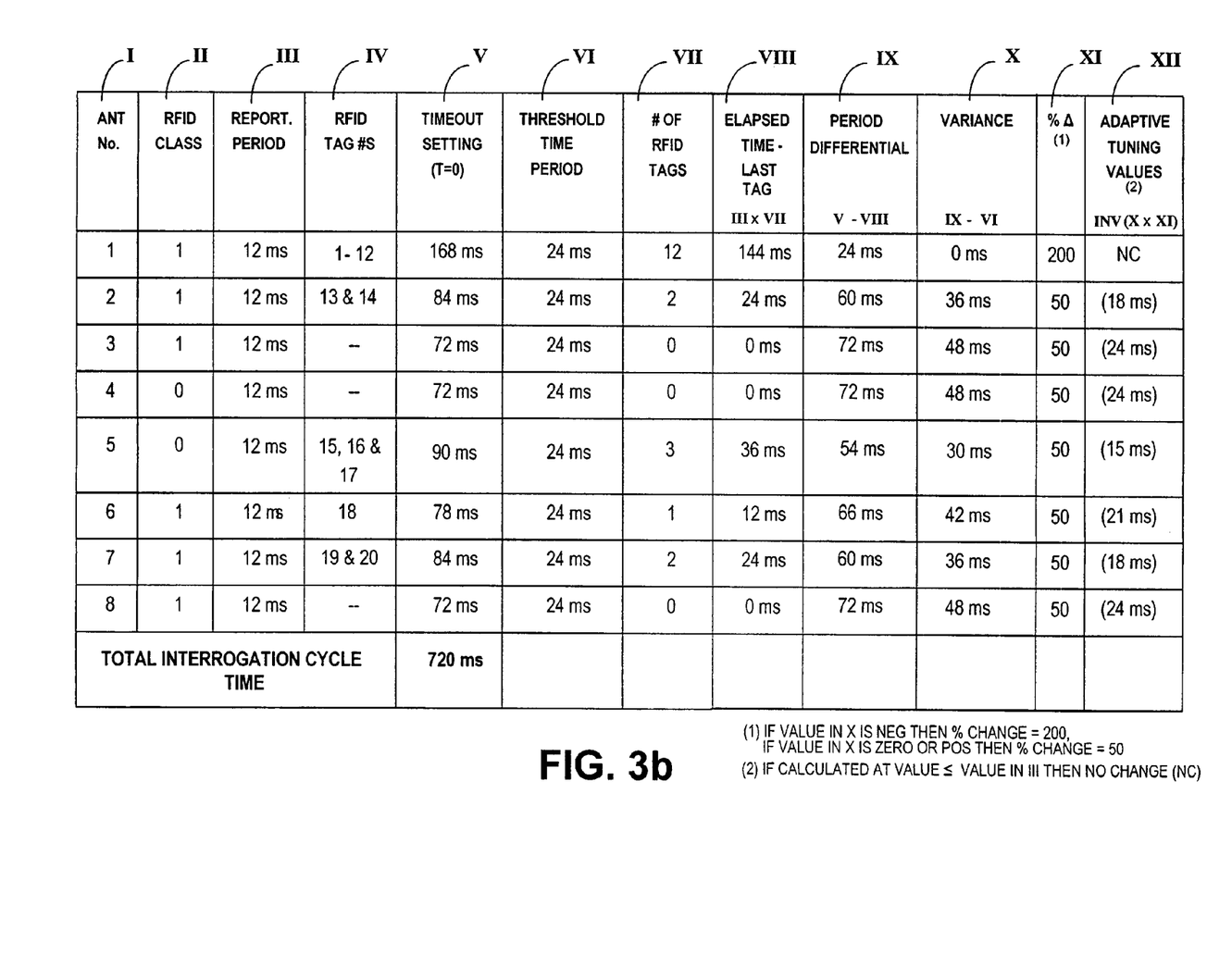
FIG. 3b shows the RFID tag information indicative of the settings and values of the RFID system following a subsequent interrogation cycle.
Figure 3C:
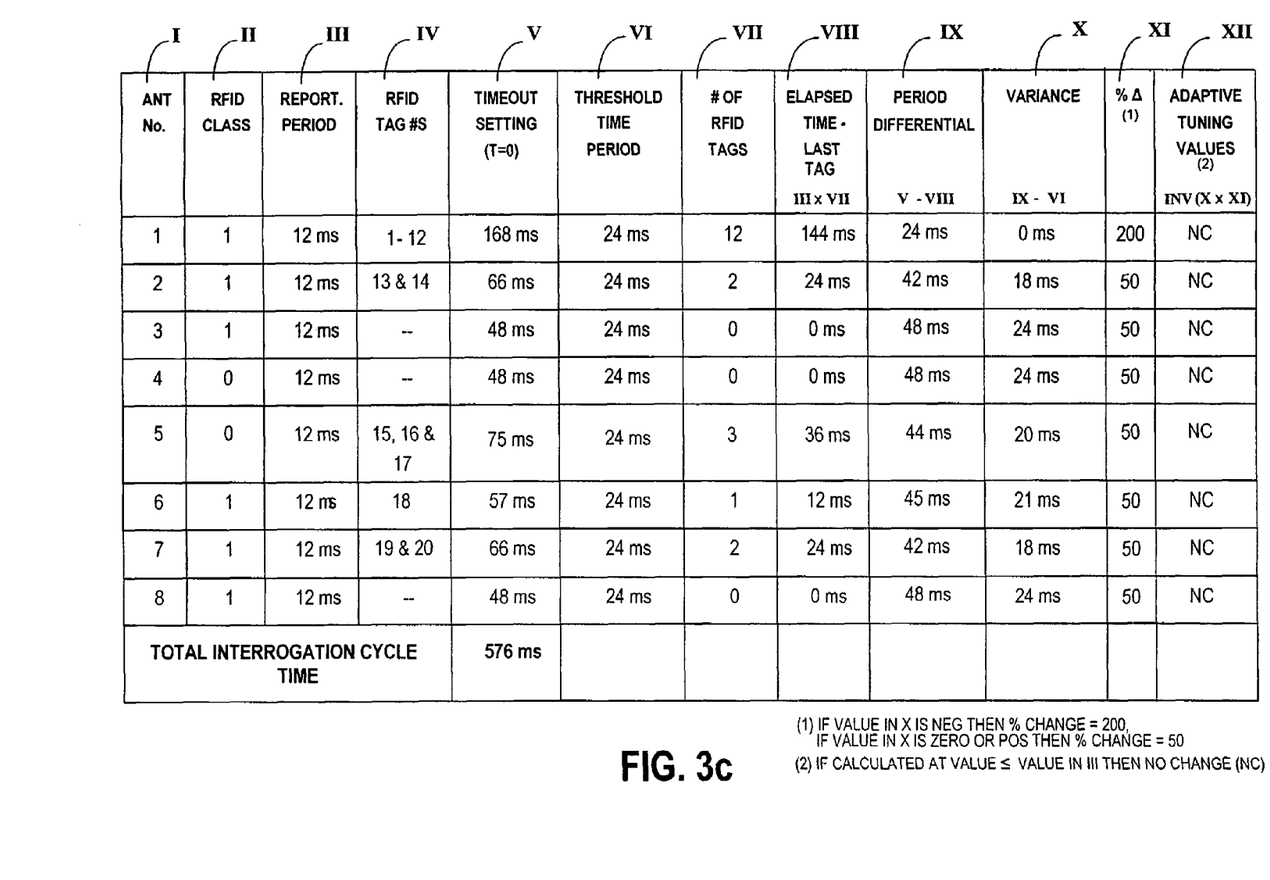
FIG. 3c shows the RFID tag information and the effects of adaptive tuning on the RFID system following a third interrogation cycle and upon reaching a steady state condition.

To better illustrate the adaptive tuning feature of the present invention, reference is made to FIGS. 3a-3c which illustrate, in tabular form, the established and calculated values described in the inventive method. Each table corresponds to one interrogation cycle of the RFID system and all of the tables sequentially span three interrogation cycles, i.e., at times T=0, T=1, and T=2. Each of the tables comprises eight rows consistent with the total number of interrogating antennas (identified in Column 1). Columns II and III define the type and reporting period, respectively, associated with each RFID tag, while Column IV identifies the total number of RFID tags disposed in each read field of the respective antenna.

Initial assumptions are made concerning the initial or baseline timeout setting in Column V and threshold time periods for each of the read fields in Column VI. Such assumptions are based on an anticipated number of ten (10) RFID tags in each read field and a threshold time period equivalent to about twice the reporting period. Accordingly, for ten (10) class 1 type RFID tags, the initial or baseline timeout setting is established at one-hundred and twenty milliseconds (120 ms), or 10 tags×12 ms. Furthermore, inasmuch as a class 1 type RFID requires an average of twelve milliseconds (12 ms) to acquire and communicate within a read field, the threshold period is established at twenty-four milliseconds (24 ms), or 12 ms×2 (twice the reporting period).

At time T=0, or during the first interrogation cycle, ten (10) of the twelve (12) total RFID tags (see Column VII) are capable of responding within the established timeout setting of one-hundred and twenty milliseconds (120 ms). Hence, on an imaginary timeline, the time elapsed from the beginning of the RF interrogation pulse to the time that the last RFID tag responds, i.e., the value shown in column VIII, corresponds to the one-hundred and twenty millisecond (120 ms) mark on the imaginary timeline. During activation of the read field produced by antenna # 1, therefore, adequate time was not available for all of the RFID tags to report. That is, at least two (2) RFID tags have not reported or communicated with interrogating antenna No. 1. Inasmuch as, in the example provided, the magnitude of the timeout setting is exactly equal to the time elapsed for the last RFID tag to respond, the period differential, identified in Column IX is equal to zero (0). That is, the timeout setting (Column V) minus the time elapsed (Column XIII)=one hundred twenty milliseconds (120 ms) minus one hundred twenty milliseconds (120 ms) for ten (10) of the twelve (12) RFID tags to report on the imaginary timeline. Furthermore, as discussed earlier, the variance, seen in Column X, is equal to the difference between the period differential and the threshold time period. Accordingly, the variance is equal to zero (0) minus twenty-four milliseconds (24 ms) or a value of negative twenty-four milliseconds (−24 ms). In accordance with conventional accounting or spreadsheet practices, parentheses are used in the table to denote negative values.

In Columns XI and XII, the percentage and values for modifying or adaptively tuning the timeout setting for subsequent interrogation cycles are shown. These values modify the data associated with the subsequent interrogation cycles at T=1 and T=2, shown in FIGS. 3b and 3c, respectively. In the described embodiment, the variance is incremented by two-hundred percent (200%) and decremented by fifty percent (50%) to yield the adaptive tuning values shown in Column XII. Although, it may be desirable to vary the magnitude of the multiplier or quotient to depending upon the magnitude of the period differential or variance to more rapidly approach optimal tuning values.

If the adaptive tuning value, e.g., after incrementing or decrementing the variance, is less than a tuning threshold then a steady state condition S may be achieved and no further modification/change NC is effected during the next or subsequent interrogation cycle. For the purposes of setting forth an example in the Tables of FIGS. 3a-3c, a range of tuning thresholds was established as being equal to the absolute value of the reporting period. Consequently, for a class 1 RFID tag, a range of between ±twelve milliseconds (±12 ms)

was chosen to effect a steady state condition. While such steady state condition may be deemed desirable, it should be appreciated that a steady state condition is not essential to the operation of the RFID system. That is, the system can be permitted to fluctuate with each interrogation cycle.

Before moving on to a discussion of the subsequent tables, it should be appreciated that a complete or total interrogation cycle, shown in Row No 9, Column V, equals the summation of all timeout settings or nine hundred and sixty milliseconds (960 ms). In the subsequent paragraphs, it will be understood that the adaptive tuning algorithm optimizes the RFID system by minimizing the time required to perform a complete interrogation cycle (i.e., performing a query of all eight (8) antennas). Further, such optimization is performed while maintaining system reliability, i.e., communication with all RFID tags within the respective read fields.

Referring now to FIG. 3b, the timeout settings (T=1 shown in Column V) for each of the interrogating antennas Nos. 1-8 have been varied, i.e., incremented or decremented, by the Adaptive Tuning Values (ATVs) identified in, Column XII of FIG. 3a. More specifically, upon incrementing the timeout setting to one-hundred and sixty-eight milliseconds (168 ms) in connection with antenna No. 1, all RFID tags are now able to report or communicate with the reader with time remaining i.e., a period differential of twenty-two (24 ms) in Column IX. Inasmuch as the variance between the threshold time period of twenty-four is zero (0) and the adaptive tuning value after variance is less than the reporting period of twelve (12 ms), it may be concluded that a steady state condition S (see Column XI) has been achieved during this interrogation cycle and no change NC is required with respect to the adaptive tuning value. An examination of the table reveals that the adaptive tuning values are more refined, i.e., approaching steady state conditions, and that the total interrogation cycle time has decreased by two hundred and forty milliseconds (240 ms) to a value of seven hundred and twenty milliseconds (720 ms).

In FIG. 3c, the same analysis proceeds with the timeout settings (T=2 in Column V) being varied by the adaptive tuning values defined in the prior table (FIG. 3b, Column XII). Inasmuch as the comparisons and calculations are the same as those previously discussed, it is suffice to say that the period differential and variance are sufficiently refined (i.e., within a window or range of values) such that the adaptive tuning values have reached steady state conditions. Furthermore, the interrogation cycle time has been optimized by an additional one hundred and forty-four milliseconds (144 ms) to a value of five hundred and seventy-six milliseconds (576 ms). As such, the interrogation cycle time will remain this value (i.e., with all antennas having reached steady state conditions) until some movement of at least one RFID tag occurs.

In addition to adaptive tuning algorithms for improving the responsiveness of an RFID system, the inventive method also enhances the accuracy of RFID systems, particularly when the system has or exhibits a propensity for inconsistent RFID tag reporting, i.e., exhibits intermittent or erratic behavior. As discussed in the Background of the Invention, anomalous reporting behavior can be detected relating to intermittent RFID tag reporting, i.e., in one interrogation cycle report critical information and, in a subsequent interrogation cycle, be silent. While the precise mechanism for such behavior may not always be fully understood, it is generally agreed that certain ambient conditions effecting the transmission and/or attenuation of the RF energy may be the source of, or root cause for, the disruption. For example, should the RFID tag be located adjacent or proximal to a structure which is highly absorptive, e.g., a metallic structure capable of attenuating RF energy, then the tag may be unable to harvest sufficient RF energy to power the internal microchip.

While the prior description discussed an adaptive tuning methodology for optimizing the time/accuracy of information obtained by the RFID system, the present invention also adaptively sets/tunes the timeout setting to ensure that each RFID tag has ample opportunity to harvest the RF energy within a respective read field. More specifically, and referring to FIG. 4a, the inventive method enhances the responsiveness of an RFID system wherein the RFID tags thereby may be situated at or along the outer reaches/boundaries of a read field. Similar to step A described previously, in step A1 of FIG. 4a, a timeout setting is established within each read field consistent with the type/class and number of anticipated RFID tags disposed therein.

Figure 4A:
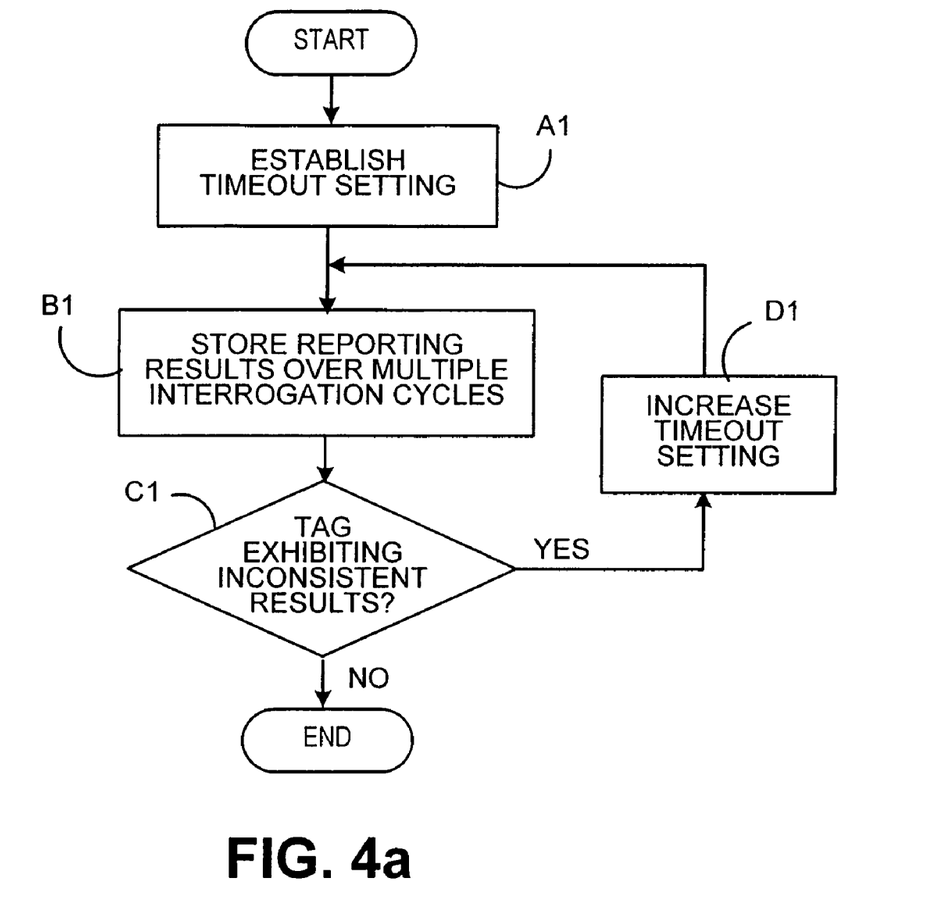
FIG. 4a is a flow diagram of a method for enhancing the performance of an RFID system by increasing the timeout setting of the RFID system to optimize the transmission and receipt of RF energy by the RFID tags/devices within the respective read field.

In steps B1 and C1, a determination is made concerning when an RFID tag may be exhibiting inconsistent reporting behavior. Such determination is made in step B1 by comparing the RFID tag results over multiple interrogation cycles (i.e., within a particular read field. For example, if over the course of at least three interrogation cycles, one of the RFID tags is first responsive, e.g., reports its tag-specific information to the reader, is non-responsive during a second interrogation cycle, but is once again responds on a third interrogation cycle, it may be reasonable to conclude that the RFID tag is either faulty, i.e., detuned, located along the outer bounds of the read field, or in a region of the read field which distorts or changes the RF properties of the read field, i.e., a region which attenuates or absorbs RF energy.

Upon an affirmative determination that such intermittent reporting behavior is exhibited, in step C1, the timeout setting is increased, in step D1, to mitigate or eliminate such anomalous reporting behavior. While the precise mechanism for such behavior may be difficult to characterize, by increasing the timeout setting, the RFID tag is provided additional time to harvest the RF energy and report or respond to the reader. In the described embodiment, the timeout setting is increased by 300%, or about three times the reporting period for the particular class of RFID tag. However, due to the various conditions which may be present in a read field, this value may be best determined through empirical evaluation or analysis.

Figure 4B:
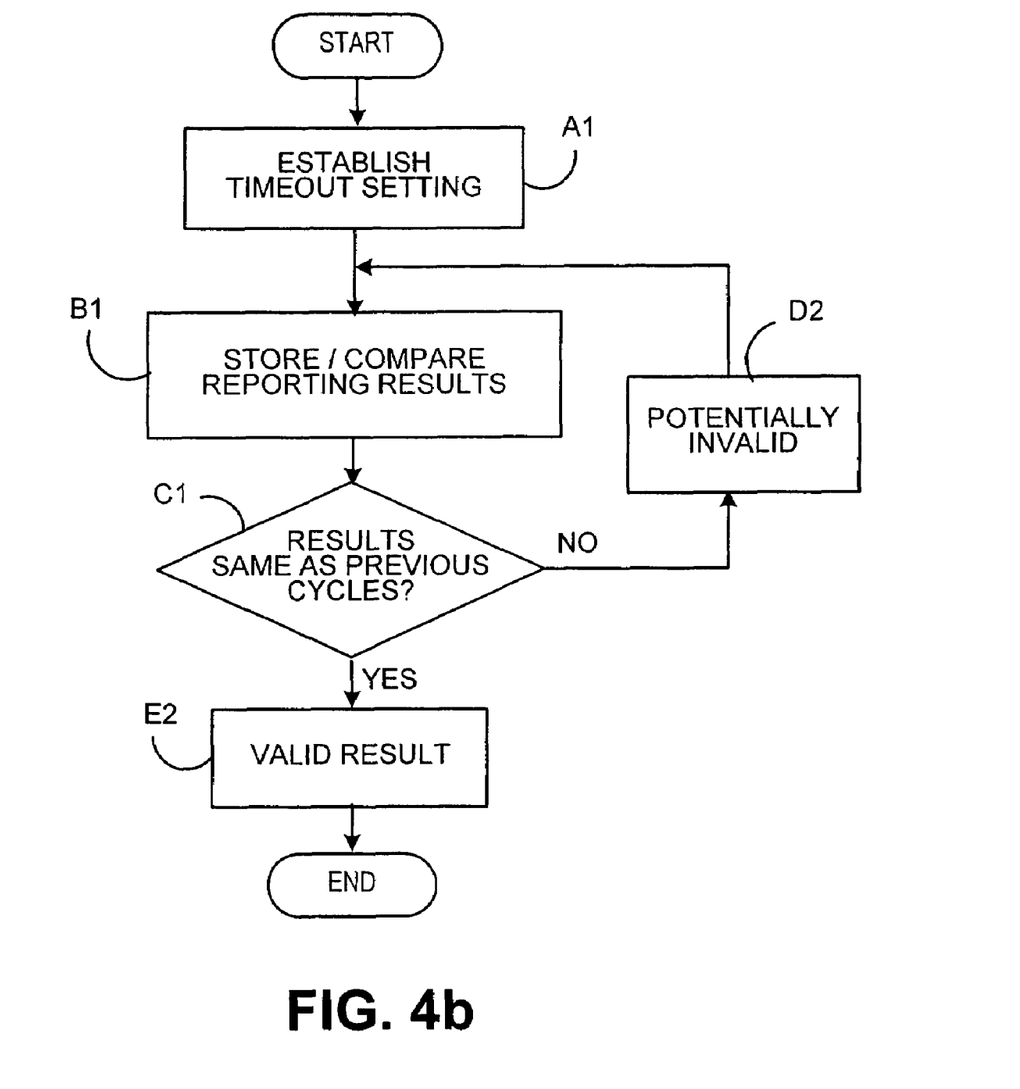
FIG. 4b is a flow diagram of a method for enhancing the performance of an RFID system by evaluating and confirming RFID tag responses over multiple interrogation cycles.

In another embodiment of the inventive method depicted in FIG. 4b, additional confidence in the veracity of the RFID response may be obtained by evaluating responses of the RFID tags over several interrogation cycles and accepting a response as being valid only when several sequential interrogation cycles yield identical results. In this embodiment, steps A1-C1 are essentially the same as that previously described with respect to FIG. 4a, however, this alternate method seeks confirmation of a negative response or "a disappear" over a number of consecutive cycles. As used herein, the term "a disappear" event corresponds to the absence of an ID signal from a specific RFID tag. Conversely, however, a positive response or "appear" event does not require consecutive cycles to consider such event as valid.

For example, if the RFID system reports numerous appear and disappear event pairs, then the performance enhancement algorithm is activated. Upon activation, the algorithm will increase the number of consecutive cycles before reporting a disappear event. That is, the system will conclude or accept that the response is valid only after an RFID tag is silent for this number of consecutive cycles. This may be implemented by means of a counter associated with each RFID tag and decrementing the counter each time that the RFID tag is silent. When the counter reaches zero, the system may confidently report that the RFID tag is absent, i.e., has moved from its respective read field.

Of course, the method steps in FIG. 4b may also incorporate step D1 which involves increasing the timeout setting to increase the time available to the RFID tag to harvest the RF energy. Notwithstanding an increase to the timeout setting, a greater confidence level may be achieved by awaiting a set of common or like responses.

While the present invention has been described in the context of a method for operating an RFID system, it will be readily apparent that the various method steps may be conducted by a processor having program code for controlling the reader. Alternatively, a separate processor/controller may be disposed in communication with the reader for issuing the necessary commands or input signals to perform the various method steps including the various adaptive tuning algorithms described herein. Accordingly, the initial timeout settings and/or threshold time periods may reside in program code and the program code may be integral with the reader/controller.

Although the invention has been described with respect to a preferred embodiment thereof, it will be understood by those skilled in the art that the foregoing and various other changes, omissions and deviations in the form and detail thereof may be made without departing from the scope of this invention.

What is claimed is:

1. A method for enhancing the accuracy a Radio Frequency IDentification (RFID) system exhibiting a propensity for inconsistent RFID tag reporting, the RFID system having at least one interrogating antenna for transmitting RF energy within a read field during an interrogation cycle, and an RFID tag within the read field communicating with the antenna; the method comprising the steps of:

establishing a timeout setting indicative of the time that each interrogating antenna transmits RF energy within a respective read field;

determining when an RFID tag exhibits inconsistent reporting behavior within a read field; and increasing the timeout setting of the respective interrogating antenna when the inconsistent reporting behavior is exhibited.

2. The method according to claim 1 wherein the inconsistent reporting behavior is characterized by an intermittent response of the RFID tag.

3. The method according to claim 2 wherein the intermittent response occurs over at least three (3) interrogation cycles.

4. The method according to claim 1 further comprising the steps of:

evaluating the response of the inconsistent reporting RFID tag over multiple interrogation cycles, and accepting the response as being valid following several interrogation cycles yielding identical results.

5. The method according to claim 1 further comprising the steps of:

calculating a period differential between the timeout setting and an elapsed time for a final RFID tag within the respective read field to communicate its RFID tag information; and varying the timeout setting of each interrogating antenna based upon the magnitude of the period differential.

6. The method according to claim 5 further comprising the steps of:

establishing a threshold time period X;

determining a variance indicative of the difference between the threshold time period X and the period differential, and varying the timeout setting of each interrogating antenna based upon the magnitude of the variance.

7. The method according to claim 5 wherein the threshold time period is based on a number of RFID tags anticipated to be within the respective read field.

8. The method according to claim 6 wherein the threshold time period X is based upon the reporting time period required for an RFID to acquire RF energy and transmit information to an interrogating antenna.

9. The method according to claim 8 wherein the threshold time period X is a percentage equal to at least 150% of the reporting time period.

10. The method according to claim 8 wherein the threshold time period X is a percentage equal to at least 200% of the reporting time period.

11. The method according to claim 6 wherein the step of varying the timeout setting further comprises the step of decrementing the timeout setting by a first value when the period differential exceeds the threshold time period.

12. The method according to claim 11 wherein the first value is about 50% of the variance.

13. The method according to claim 6 wherein the step of varying the timeout setting further comprises the step of incrementing the timeout setting by a second value when the period differential is less than the threshold time period.

14. The method according to claim 13 wherein the second value is about 200% of the variance.

15. The method according to claim 5 wherein the RFID system sequentially interrogates each read field by serially querying the RFID antennas within an interrogation cycle, and further comprising the step of varying the timeout setting of each interrogating antenna by an adaptive tuning value with each interrogation cycle.

16. A method for evaluating the veracity of an Radio Frequency IDentification (RFID) system which has or may exhibit inconsistent RFID tag reporting behavior, the RFID system having at least one interrogating antenna for transmitting RF energy within a read field during an interrogation cycle, and an RFID tag within the read field for communicating with the antenna; the method comprising the steps of:

evaluating responses of the RFID tags over several interrogation cycles, and accepting a response from an RFID tag as being valid when several consecutive interrogation cycles yield identical results.

17. The method according to claim 16 wherein a non-response of an RFID tag indicates movement out of a read field and wherein the step of valid acceptance includes determining that the RFID tag has moved following at least three (3) sequential interrogation cycles.

18. The method according to claim 16 further comprising the steps of:

calculating a period differential between the timeout setting and an elapsed time for a final RFID tag within the respective read field to communicate its RFID tag information; and varying the timeout setting of each interrogating antenna based upon the magnitude of the period differential.

19. The method according to claim 18 further comprising the steps of:

establishing a threshold time period X;
determining a variance indicative of the difference between the threshold time period X and the period differential, and
varying the timeout setting of each interrogating antenna based upon the magnitude of the variance.

* * * * *